(12) United States Patent
Edwards et al.

(10) Patent No.: US 10,477,025 B1
(45) Date of Patent: Nov. 12, 2019

(54) UTILIZING MACHINE LEARNING WITH CALL HISTORIES TO DETERMINE SUPPORT QUEUE POSITIONS FOR SUPPORT CALLS

(71) Applicant: Capital One Services, LLC, McLean, VA (US)

(72) Inventors: Joshua Edwards, Philadelphia, PA (US); Abdelkadar M'Hamed Benkreira, Washington, DC (US); Michael Mossoba, Arlington, VA (US); Alexandra Colevas, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/227,997

(22) Filed: Dec. 20, 2018

(51) Int. Cl.
*H04M 3/523* (2006.01)

(52) U.S. Cl.
CPC .... *H04M 3/5232* (2013.01); *H04M 2203/551* (2013.01); *H04M 2203/6045* (2013.01)

(58) Field of Classification Search
CPC ......... H04M 3/5232; H04M 2203/551; H04M 2203/6045
USPC ....................................... 379/266.01–266.03
See application file for complete search history.

(56) References Cited

U.S. PATENT DOCUMENTS

| | | | | |
|---|---|---|---|---|
| 5,946,388 A | * | 8/1999 | Walker | H04M 3/523 379/265.02 |
| 6,088,444 A | * | 7/2000 | Walker | H04Q 3/64 379/266.02 |
| 6,882,641 B1 | * | 4/2005 | Gallick | H04M 3/5191 370/252 |
| 8,903,079 B2 | | 12/2014 | Xie et al. | |
| 2003/0108162 A1 | * | 6/2003 | Brown | H04M 1/575 379/88.01 |
| 2009/0190750 A1 | | 7/2009 | Xie et al. | |
| 2010/0303226 A1 | * | 12/2010 | Kradjel | H04M 3/5232 379/266.01 |
| 2011/0185293 A1 | * | 7/2011 | Barnett | H04M 3/5232 715/760 |
| 2012/0265695 A1 | | 10/2012 | Tuchman et al. | |
| 2014/0244398 A1 | * | 8/2014 | Wasilewski | G06Q 30/0269 705/14.66 |

* cited by examiner

*Primary Examiner* — Harry S Hong
(74) *Attorney, Agent, or Firm* — Harrity & Harrity, LLP

(57) ABSTRACT

A device receives, from a user device, a communication associated with a support issue encountered by a user of the user device and assigns the communication to a position in a support queue based on when the communication is received, wherein the support queue includes data identifying positions of other communications received from other users, and data identifying when the other communications were received. The device processes data identifying the communication and historical communication data describing prior communications associated with the user, with a model, to determine an average time spent on hold by the user for the prior communications. The device modifies the position of the communication in the support queue based on the average time and performs one or more actions based on modifying the position of the communication in the support queue.

20 Claims, 15 Drawing Sheets

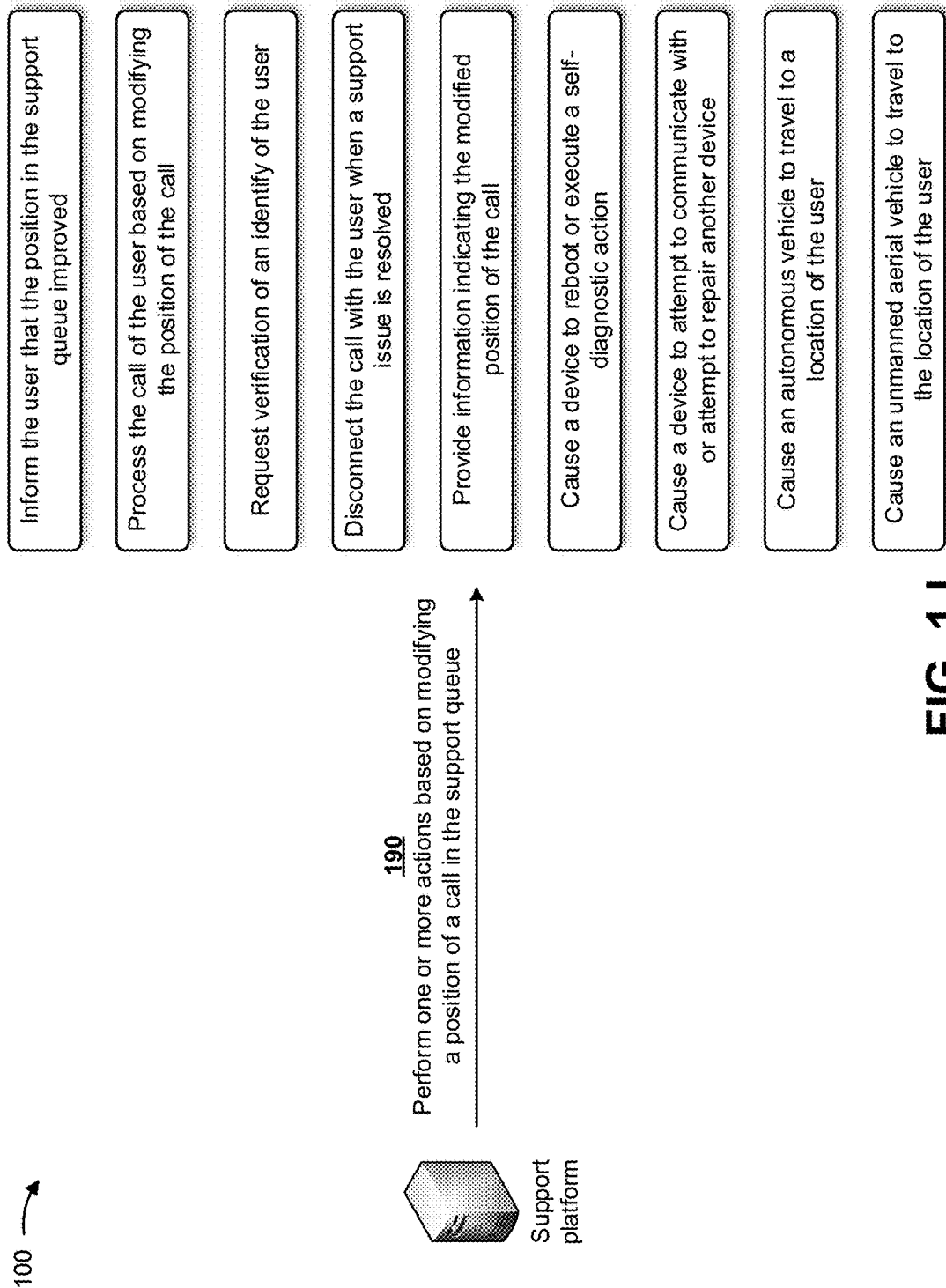

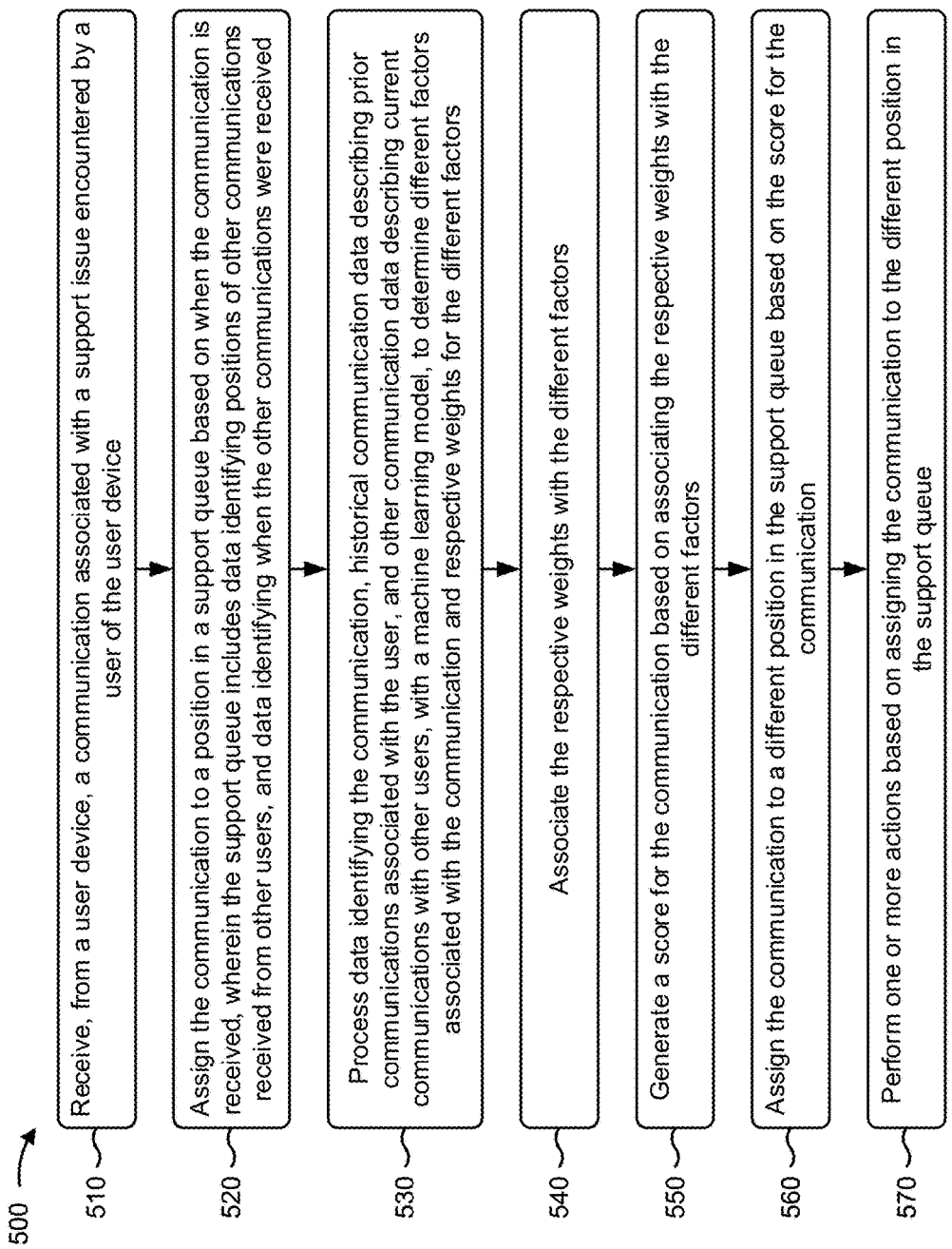

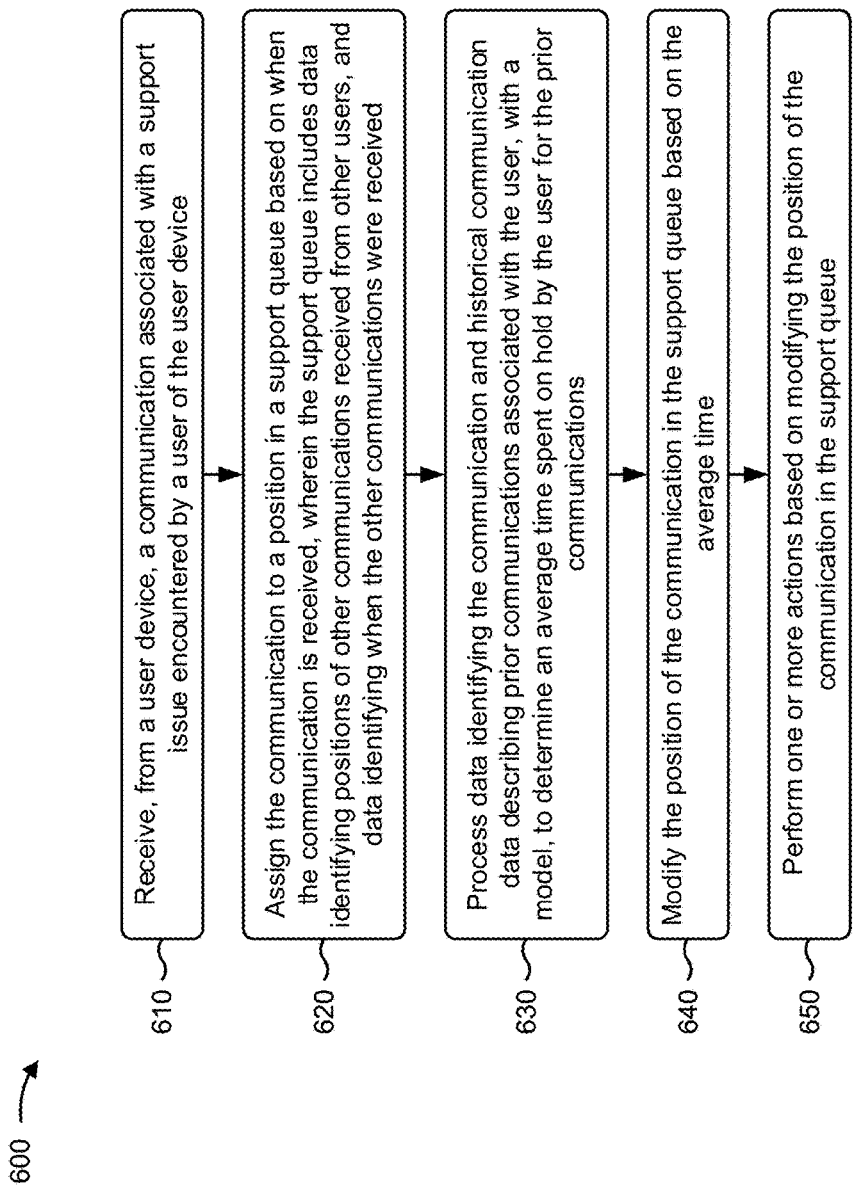

US 10,477,025 B1

UTILIZING MACHINE LEARNING WITH CALL HISTORIES TO DETERMINE SUPPORT QUEUE POSITIONS FOR SUPPORT CALLS

BACKGROUND

When a user or a customer experiences an issue with a product or a service, the user may place a call to a service center to seek support for addressing the issue with the product or the service. Typically, the user waits on hold for a period of time before the call is connected with support personnel at the service center.

SUMMARY

According to some implementations, a method may include receiving, from a user device, a communication associated with a support issue encountered by a user of the user device, and assigning the communication to a position in a support queue based on when the communication is received, wherein the support queue may include data identifying positions of other communications received from other users, and data identifying when the other communications were received. The method may include processing data identifying the communication, historical communication data describing prior communications associated with the user, and other communication data describing current communications with other users, with a machine learning model, to determine different factors associated with the communication and respective weights for the different factors. The method may include associating the respective weights with the different factors and generating a score for the communication based on associating the respective weights with the different factors. The method may include modifying the position of the communication in the support queue based on the score for the communication and scores for the other communications and performing one or more actions based on modifying the position of the communication in the support queue.

According to some implementations, a device may include one or more memories and one or more processors, communicatively coupled to the one or more memories, to receive, from a user device, a communication associated with a support issue encountered by a user of the user device, and assign the communication to a position in a support queue based on when the communication is received, wherein the support queue may include data identifying positions of other communications received from other users, and data identifying when the other communications were received. The one or more processors may process data identifying the communication, historical communication data describing prior communications associated with the user, and other communication data describing current communications with other users, with a machine learning model, to determine different factors associated with the communication and respective weights for the different factors. The one or more processors may associate the respective weights with the different factors and may generate a score for the communication based on associating the respective weights with the different factors. The one or more processors may assign the communication to a different position in the support queue based on the score for the communication and may perform one or more actions based on assigning the communication to the different position in the support queue.

According to some implementations, a non-transitory computer-readable medium may store instructions that include one or more instructions that, when executed by one or more processors of a device, cause the one or more processors to receive, from a user device, a communication associated with a support issue encountered by a user of the user device and assign the communication to a position in a support queue based on when the communication is received, wherein the support queue may include data identifying positions of other communications received from other users, and data identifying when the other communications were received. The one or more instructions may cause the one or more processors to process data identifying the communication and historical communication data describing prior communications associated with the user, with a model, to determine an average time spent on hold by the user for the prior communications. The one or more instructions may cause the one or more processors to modify the position of the communication in the support queue based on the average time and perform one or more actions based on modifying the position of the communication in the support queue.

BRIEF DESCRIPTION OF THE DRAWINGS

FIGS. 1A-1J are diagrams of an example implementation described herein.

FIGS. 4-6 are flow charts of example processes for utilizing machine learning with call histories to determine support queue positions for support calls.

DETAILED DESCRIPTION

The following detailed description of example implementations refers to the accompanying drawings. The same reference numbers in different drawings may identify the same or similar elements.

Calls to a service center are typically queued in an order that the calls are received by the service center. Many times, a user calls the service center to resolve a simple issue (e.g., that requires little time to resolve) and must wait a long time in the queue. Further, a nuisance user may call the service center all the time, even when no issue exists for the nuisance user, and may be placed at the top of the queue. Such scenarios create the technical problems of rewarding nuisance users, penalizing users with simple issues, providing poor customer support, wasting resources (e.g., processing resources, memory resources, human resources, and/or the like) processing unnecessary calls, and/or the like.

Some implementations described herein provide a support platform that utilizes machine learning with call histories to determine support queue positions for support calls. For example, the support platform may receive, from a user device, a communication associated with a support issue encountered by a user of the user device and may assign the communication to a position in a support queue based on when the communication is received, wherein the support queue may include data identifying positions of other communications received from other users, and data identifying when the other communications were received. The support platform may process data identifying the communication, historical communication data describing prior communications associated with the user, and other communication data describing current communications with other users, with a machine learning model, to determine different factors associated with the communication and respective weights for the different factors. The support platform may associate the respective weights with the different factors and may generate a score for the communication based on associating the respective weights with the different factors. The support platform may modify the position of the communication in the support queue based on the score for the communication and scores for the other communications and may perform one or more actions based on modifying the position of the communication in the support queue.

In this way, the support platform may reward users with simple issues and may penalize nuisance users. The support platform may reduce a waiting time for a support call of a user based on a call history of the user and based on call histories of other users. The support platform may encourage users to immediately call a service center back if an issue is not resolved, which may conserve resources (e.g., processing resources, memory resources, and/or the like) associated with processing service and/or support calls by the service center.

Figure 1A:
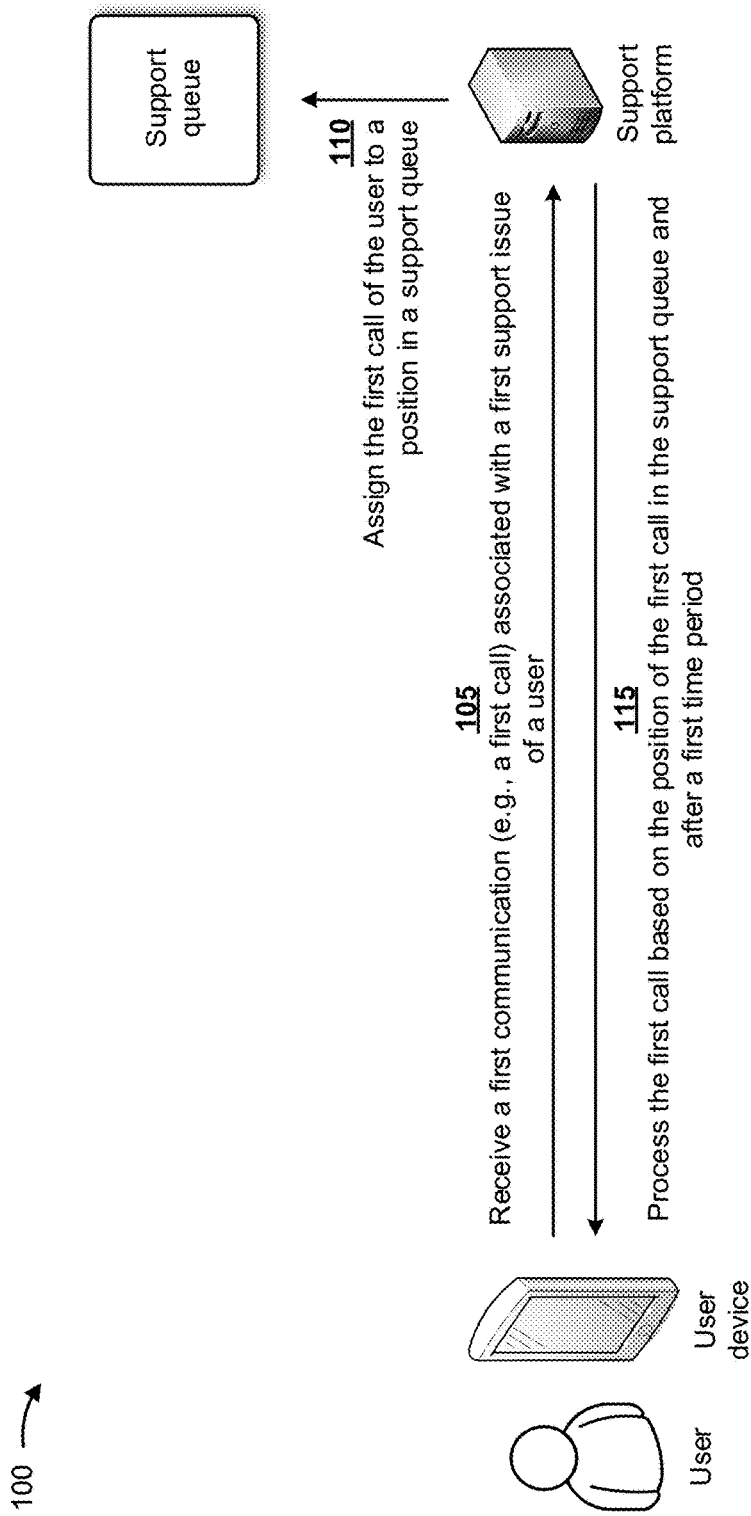

FIGS. 1A-1J are diagrams of an example implementation 100 described herein. As shown in FIGS. 1A-1J, a user device may be associated with a user (e.g., a customer seeking customer support) and a support platform. The user of the user device may utilize the user device to establish and/or provide a first communication (e.g., a call, an instant messaging session, a video session, and/or the like) with the support platform. In some implementations, the first communication may be associated with a first support issue (e.g., a network outage, a service interruption, a user device issue, and/or the like) of the user that is to be resolved by an entity associated with the support platform. As shown in FIG. 1A, and by reference number 105, the support platform may receive, from the user device, the first communication (e.g., a first call) associated with the first support issue of the user.

As further shown in FIG. 1A, and by reference number 110, the support platform may assign the first call of the user to a position in a support queue (e.g., based on when the first call is received by the support platform). In some implementations, the support queue may include a ranked list of communications (e.g., calls) received by the support platform from the user and other users (e.g., associated with other user devices). In some implementations, the support platform may rank the calls in the ranked list based on when the calls are received by the support platform. For example, an oldest call (e.g., a call that is received a longest time ago by the support platform) may be ranked first in the support queue, followed by a next oldest call, and/or the like. In some implementations, the support queue may be stored in a data structure (e.g., a database, a table, a list, and/or the like) associated with the support platform. In some implementations, the support platform may address the calls in the support queue based on the rankings of the calls (e.g., with a first ranked call being addressed first, followed by a second ranked call, and/or the like).

As further shown in FIG. 1A, and by reference number 115, the support platform may process the first call based on the position of the first call in the support queue and after a first time period (e.g., a waiting time). In some implementations, the support platform may determine actions to perform based on the first support issue of the user and may perform the actions to process the first call; may connect support personnel with the user (e.g., for provision of the actions to perform) to process the first call; and/or the like.

For example, if the first support issue relates to a network connectivity issue, the actions may include the support personnel instructing the user to power a router off and on, power a modem off and on, check an optical network terminal (ONT), check for a power outage, and/or the like. In some implementations, the support platform may determine the actions that the user may perform based on information associated with the user. For example, the user may have an account and a user profile established with the support platform, and the support platform may utilize the account and the user profile to identify potential issues associated with the account and/or the user profile (e.g., a malfunctioning router) and to determine the actions that the user may perform to correct the potential issues.

Figure 1B:
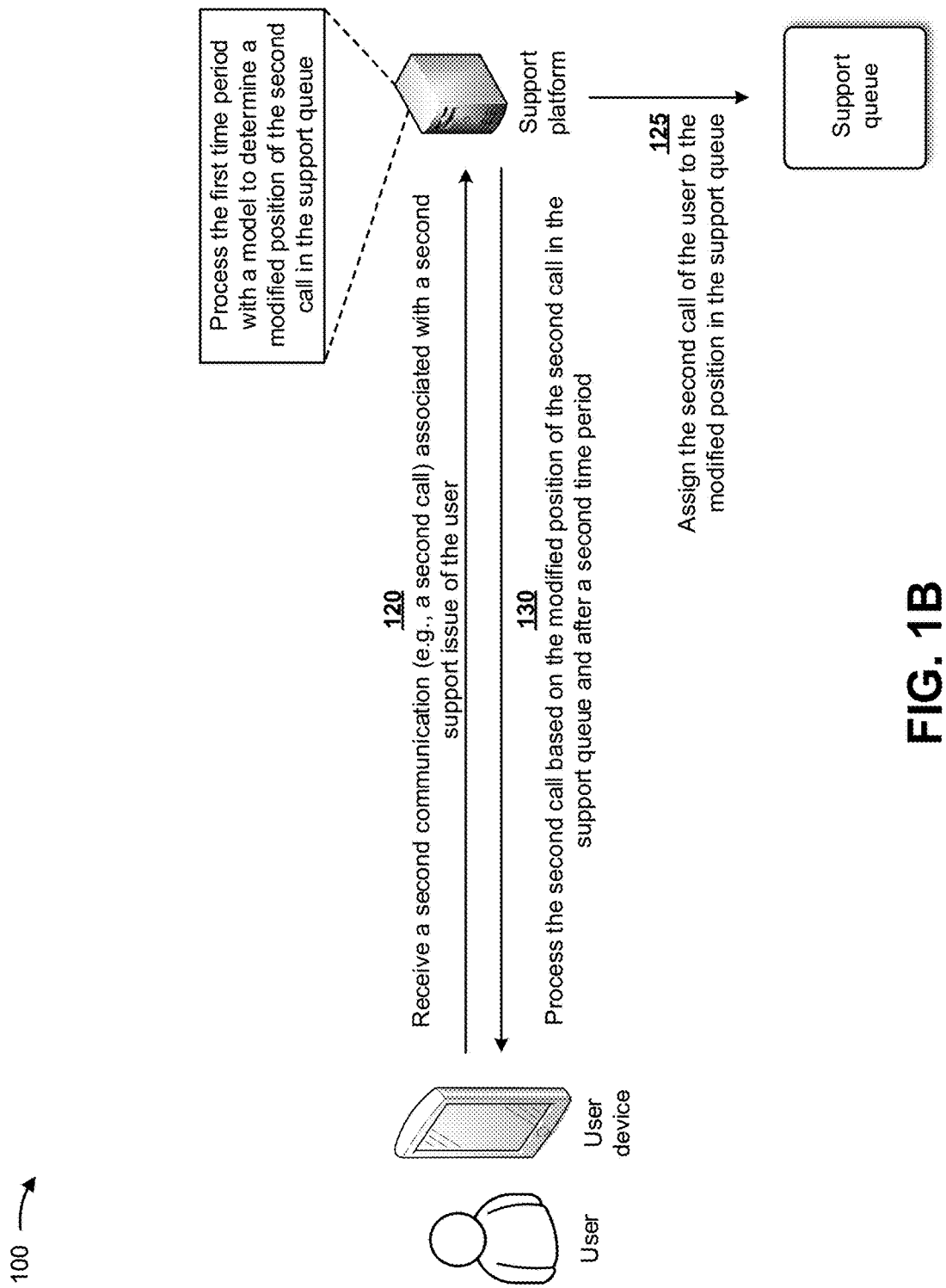

As shown in FIG. 1B, the user of the user device may utilize the user device to establish and/or provide a second communication (e.g., a call, an instant messaging session, a video session, and/or the like) with the support platform. In some implementations, the second communication may be associated with a second support issue (e.g., a network outage, a service interruption, a user device issue, and/or the like) of the user that is to be resolved by the entity associated with the support platform. As shown in FIG. 1B, and by reference number 120, the support platform may receive, from the user device, the second communication (e.g., a second call) associated with the second support issue of the user.

As further shown in FIG. 1B, the support platform may process the first time period with a model to determine a modified position of the second call in the support queue. In some implementations, the support platform may determine an average waiting time for the user based on the first time period and/or past time periods (e.g. indicating time periods that the user waited for calls to be processed). In such implementations, the support platform may utilize the average waiting time to determine the modified position of the second call in the support queue. In some implementations, the support platform may increase the position of the second call (e.g., from a fourth-ranked call to a second-ranked call) in the support queue based on the average waiting time, may maintain the position of the second call (e.g., as the fourth-ranked call) in the support queue based on the average waiting time, may decrease the position of the second call (e.g., from a fourth-ranked call to a fifth-ranked call) in the support queue based on the average waiting time, and/or the like.

As further shown in FIG. 1B, and by reference number 125, the support platform may assign the second call of the user to the modified position in a support queue. As further shown in FIG. 1B, and by reference number 130, the support platform may process the second call based on the modified position of the second call in the support queue and after a second time period (e.g., a waiting time). In some implementations, the support platform may determine actions to perform based on the second support issue of the user and may perform the actions to process the second call; may connect support personnel with the user (e.g., for provision of the actions to perform) to process the second call; and/or the like.

Figure 1C:
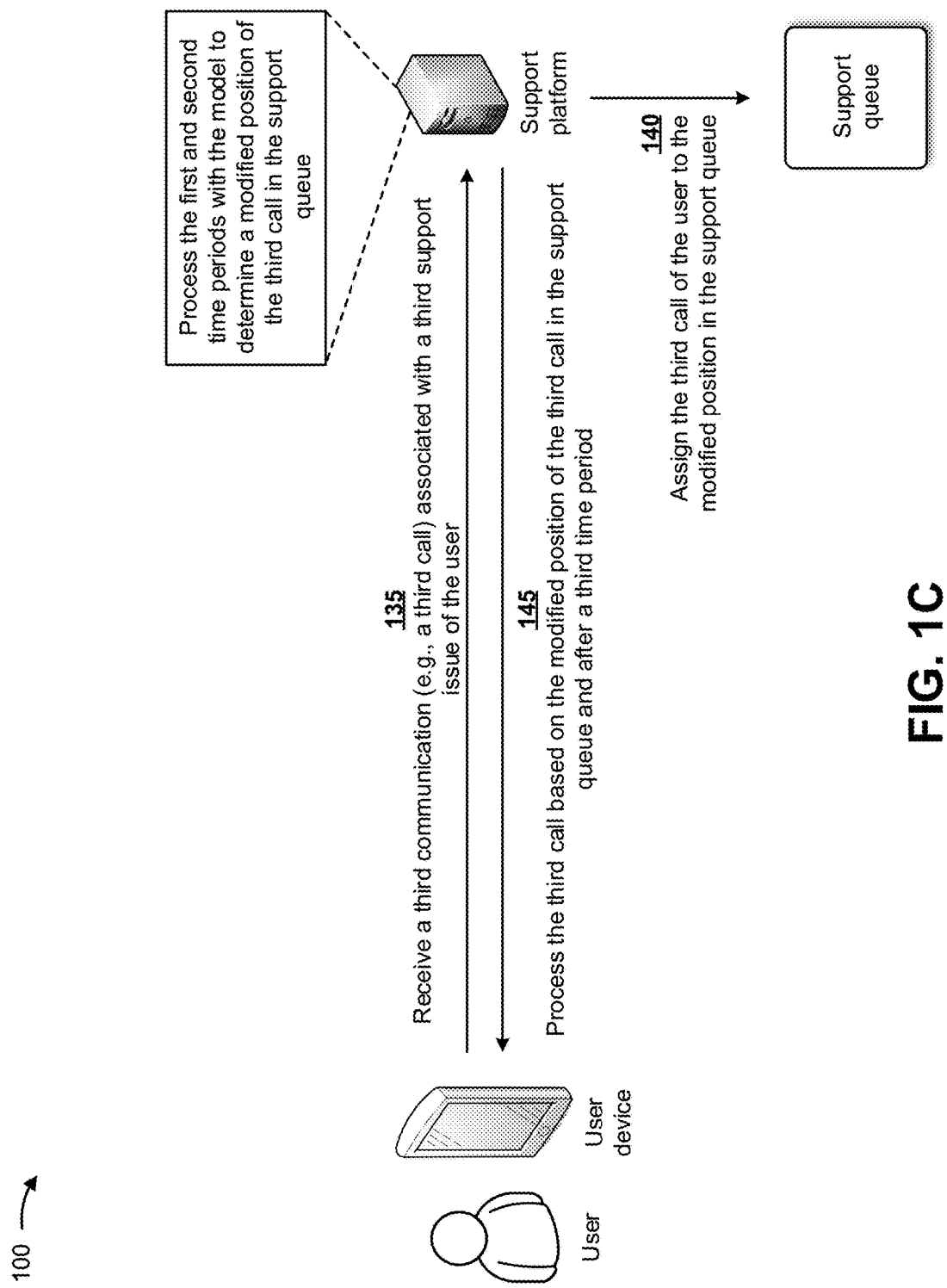

As shown in FIG. 1C, the user of the user device may utilize the user device to establish and/or provide a third communication (e.g., a call, an instant messaging session, a video session, and/or the like) with the support platform. In some implementations, the third communication may be associated with a third support issue (e.g., a network outage, a service interruption, a user device issue, and/or the like) of the user that is to be resolved by the entity associated with the support platform. As shown in FIG. 1C, and by reference number 135, the support platform may receive, from the user device, the third communication (e.g., a third call) associated with the third support issue of the user.

As further shown in FIG. 1C, the support platform may process the first time period and the second time period, with the model, to determine a modified position of the third call in the support queue. In some implementations, the support platform may determine an average waiting time for the user based on the first time period, the second time period, and/or past time periods (e.g. indicating time periods that the user waited for calls to be processed). In such implementations, the support platform may utilize the average waiting time to determine the modified position of the third call in the support queue. In some implementations, the support platform may increase the position of the third call (e.g., from a third-ranked call to a second-ranked call) in the support queue based on the average waiting time, may maintain the position of the third call (e.g., as the third-ranked call) in the support queue based on the average waiting time, may decrease the position of the third call (e.g., from a third-ranked call to a sixth-ranked call) in the support queue based on the average waiting time, and/or the like.

As further shown in FIG. 1C, and by reference number 140, the support platform may assign the third call of the user to the modified position in a support queue. As further shown in FIG. 1C, and by reference number 145, the support platform may process the third call based on the modified position of the third call in the support queue and after a third time period (e.g., a waiting time). In some implementations, the support platform may determine actions to perform based on the third support issue of the user and may perform the actions to process the third call; may connect support personnel with the user (e.g., for provision of the actions to perform) to process the third call; and/or the like.

Figure 1D:
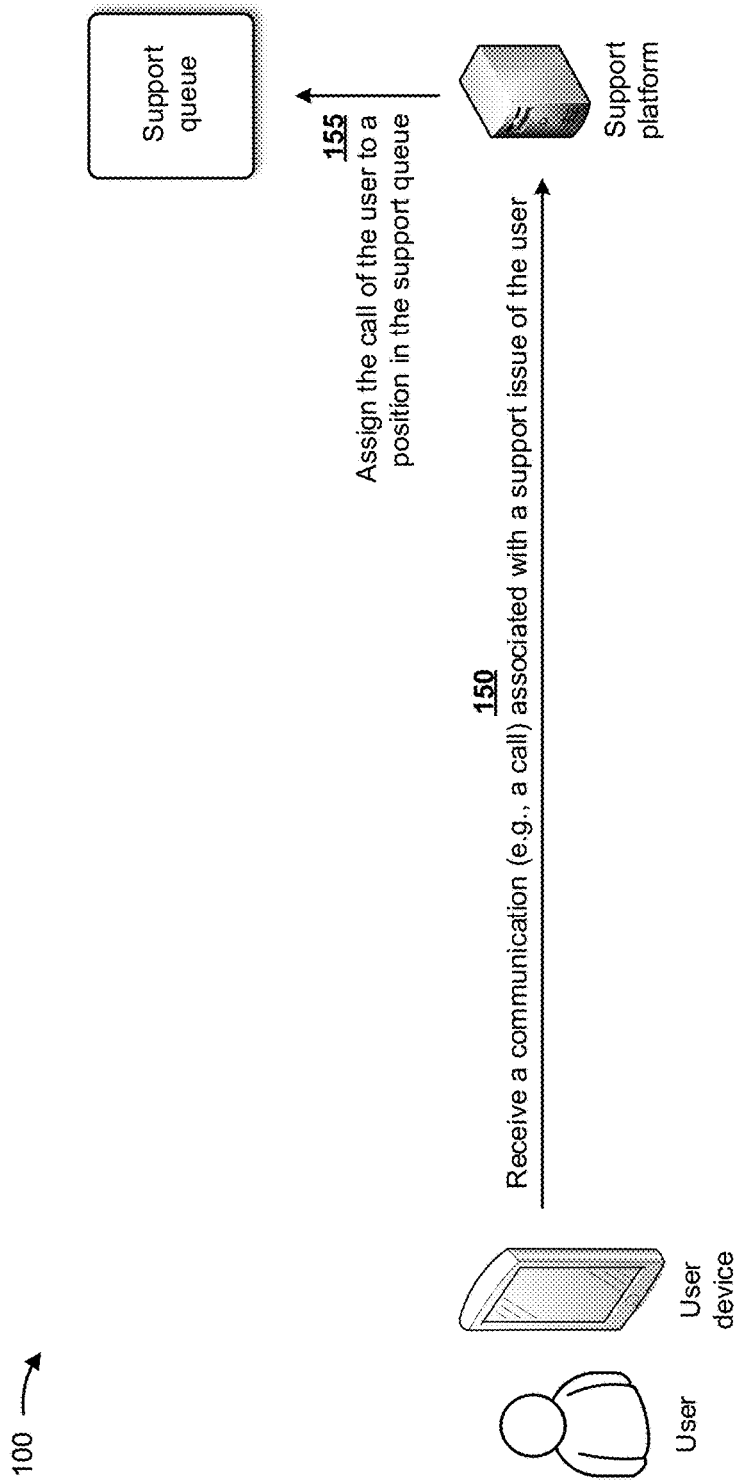

As shown in FIG. 1D, the user of the user device may utilize the user device to establish and/or provide a communication (e.g., a call, an instant message of an instant messaging session, video of a video session, and/or the like) with the support platform. In some implementations, the communication may be associated with a support issue (e.g., a network outage, a service interruption, a user device issue, and/or the like) of the user that is to be resolved by the entity associated with the support platform. As shown in FIG. 1D, and by reference number 150, the support platform may receive, from the user device, the communication associated with the support issue of the user.

As further shown in FIG. 1D, and by reference number 155, the support platform may assign the call of the user to a position in a support queue (e.g., based on when the call is received by the support platform). In some implementations, the support queue may include a ranked list of communications (e.g., calls) received by the support platform from the user and other users (e.g., associated with other user devices), as described above.

Figure 1E:
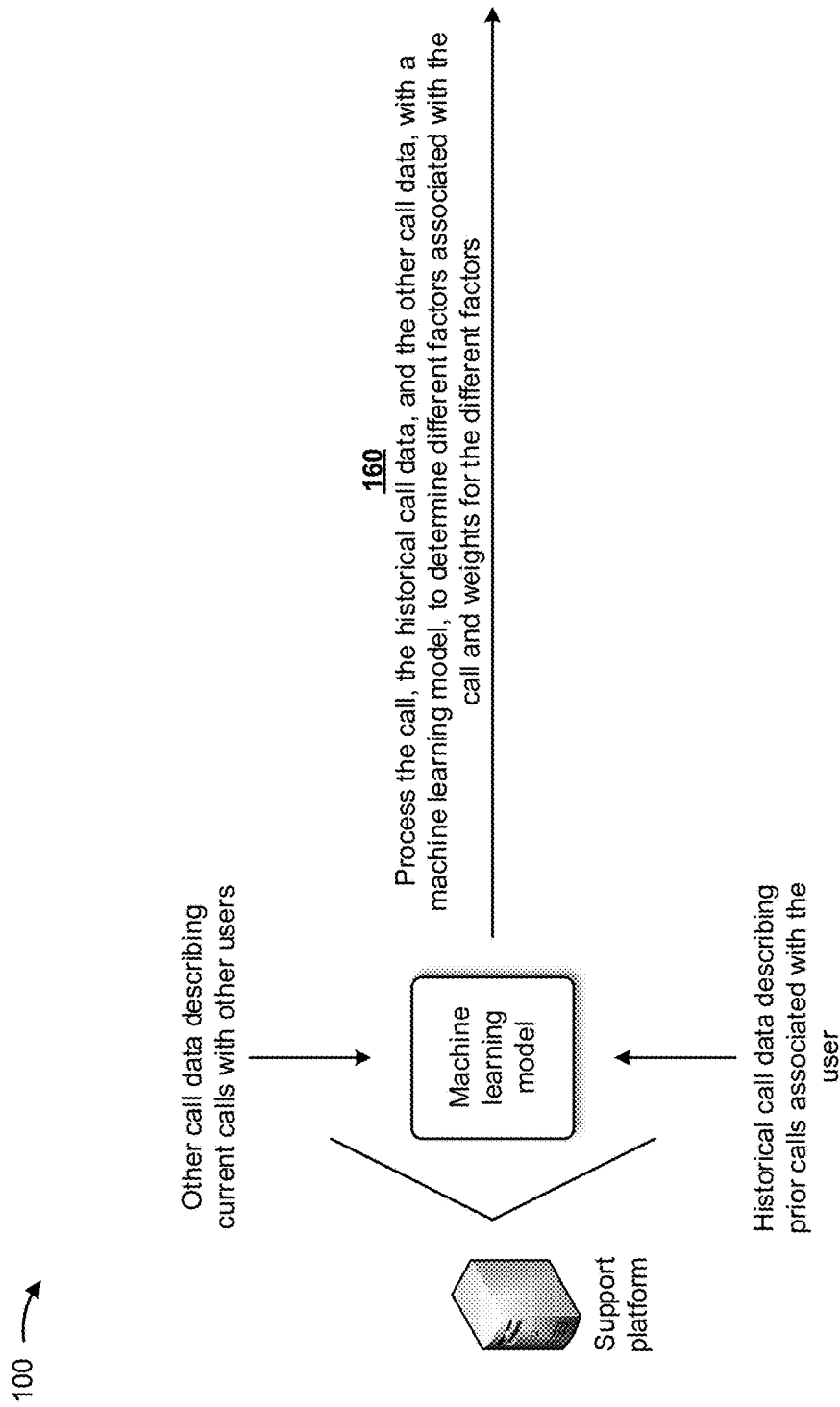

As shown in FIG. 1E, the support platform may provide, to a machine learning model, the call (e.g., call data describing the call), historical call data describing prior calls associated with the user, and other call data describing current calls with other users. As further shown in FIG. 1E, and by reference number 160, the support platform may process the call, the historical call data, and the other call data, with the machine learning model, to determine different factors associated with the call and weights for the different factors. In some implementations, the different factors may include factors utilized to determine a position of the call (e.g., a priority associated with the call), such as a factor indicating that a prior call dropped a short time period (e.g., in seconds or minutes) ago; a factor indicating a quantity of times the user has called within a particular time period (e.g., which may indicate that the user is a nuisance or has a support issue that is not resolved); a factor indicating that the call is received from a location associated with a catastrophic event (e.g., a forest fire, a hurricane, an earthquake, etc.); and/or the like.

In some implementations, the machine learning model may include a pattern recognition model that determines different factors associated with the call and weights for the different factors. In some implementations, the support platform may perform a training operation on the machine learning model with historical data. The historical data may include data indicating historical call data associated with historical calls, historical factors identified based on the historical calls, priorities allotted to the historical calls based on the historical factors, weights allotted to the historical factors, and/or the like.

The support platform may separate the historical data into a training set, a validation set, a test set, and/or the like. The training set may be utilized to the train the machine learning model. The validation set may be utilized to validate results of the trained machine learning model. The test set may be utilized to test operations of the machine learning model. In some implementations, the support platform may train the machine learning model using, for example, an unsupervised training procedure and based on the historical data. For example, the support platform may perform dimensionality reduction to reduce the historical data to a minimum feature set, thereby reducing resources (e.g., processing resources, memory resources, and/or the like) to train the machine learning model, and may apply a classification technique, to the minimum feature set.

In some implementations, the support platform may use a logistic regression classification technique to determine a categorical outcome (e.g., different factors associated with the calls and weights for the different factors). Additionally, or alternatively, the support platform may use a naïve Bayesian classifier technique. In this case, the support platform may perform binary recursive partitioning to split the historical data into partitions and/or branches and use the partitions and/or branches to perform predictions (e.g., different factors associated with the calls and weights for the different factors). Based on using recursive partitioning, the support platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the support platform may use a support vector machine (SVM) classifier technique to generate a non-linear boundary between data points in the training set. In this case, the non-linear boundary is used to classify test data into a particular class.

Additionally, or alternatively, the support platform may train the machine learning model using a supervised training procedure that includes receiving input to the machine learning model from a subject matter expert, which may reduce an amount of time, an amount of processing resources, and/or the like to train the machine learning model of activity automatability relative to an unsupervised training procedure. In some implementations, the support platform may use one or more other model training techniques, such as a neural network technique, a latent semantic indexing technique, and/or the like. For example, the support platform may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained machine learning model generated by the support platform by making the trained model more robust to noisy, imprecise, or incomplete data, and by enabling the support platform to detect patterns and/or trends undetectable to human analysts or systems using less complex techniques.

In some implementations, the support platform may receive the machine learning model from another source. In such implementations, the machine learning model may be trained as described above.

In some implementations, the machine learning model may determine, based on the historical call data, a time period between the call and the prior calls associated with the user. The machine learning model may utilize the time period to determine whether the call is associated with a same support issue as the prior calls. For example, the user may be more likely to call about a same support issue within a threshold time period (e.g., a time period of seconds, minutes, etc.). In another example, the user may be more likely to call about a different support issue outside the threshold time period (e.g., a time period of hours, days, etc.).

In some implementations, the machine learning model may determine, based on the historical call data, that a large quantity of calls is received from a malicious user trying to steal customer account information. In such implementations, the support platform may deprioritize such calls (e.g., by prioritizing other calls) and may determine whether the user can verify a user identity, whether the calls are received from an unknown number, whether the user attempts to make account changes, and/or the like.

Figure 1F:
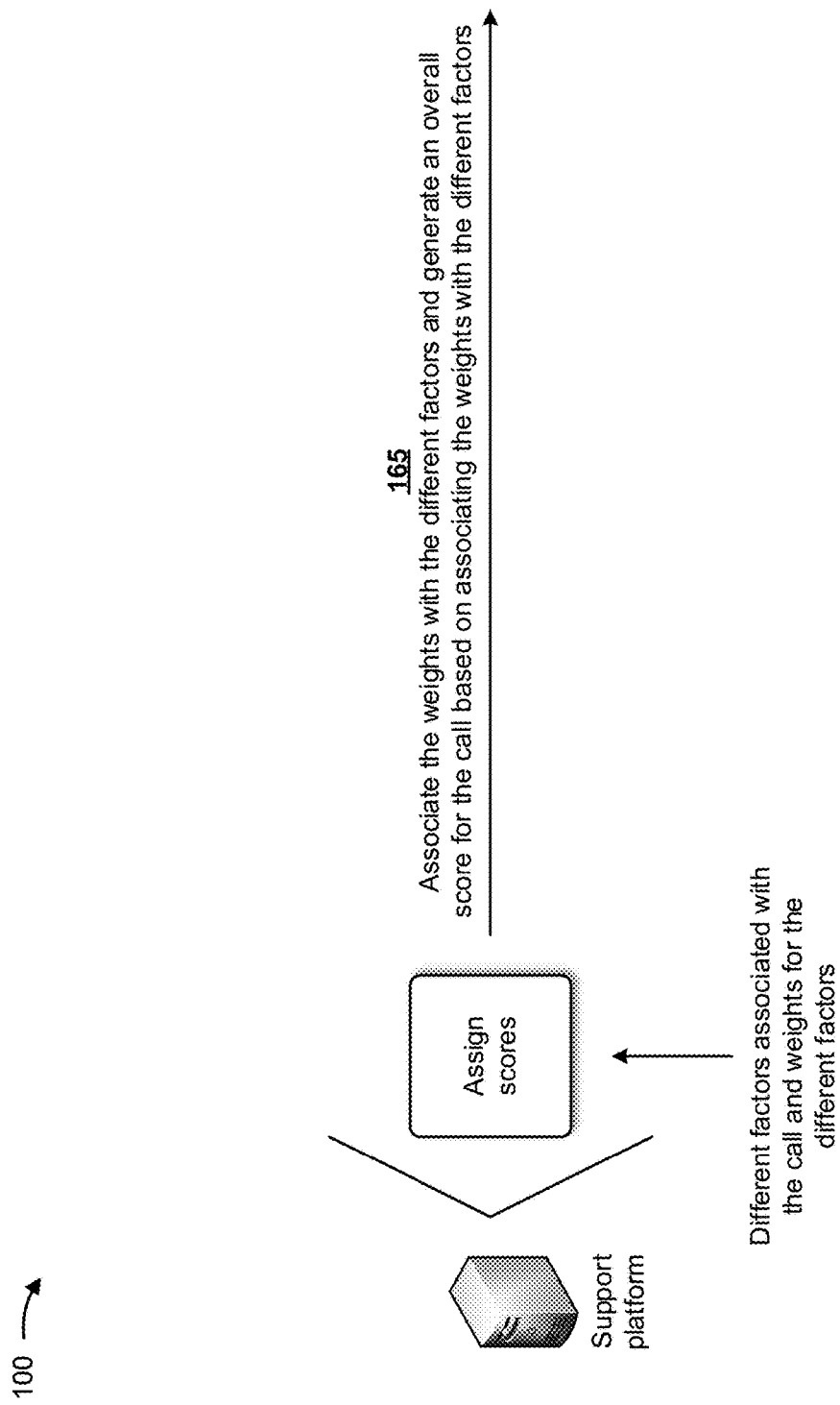

As shown in FIG. 1F, and by reference number 165, the support platform may associate the weights with the different factors and may generate an overall score for the call based on associating the weights with the different factors. In some implementations, the support platform may associate different weights or the same weights with the different factors. For example, if a factor indicates that a prior call dropped a short time period ago, the factor may be allotted a greater weight than a factor indicating that the prior call dropped a long time period ago. In another example, if a factor indicates that the user has called a threshold quantity of times within a particular time period, the factor may be allotted a lesser weight than a factor indicating that the user has not previously called. In still another example, if a factor indicates that the call is received from a location associated with a catastrophic event, the factor may be allotted a greater weight than a factor indicating that the call is received from a location not associated with a catastrophic event.

In some implementations, the support platform may generate an overall score for the call based on associating the weights with the different factors. In some implementations, different factors may include different scores based on the respective weights associated with the different factors. In such implementations, the support platform may generate the overall score for the call based on adding or otherwise combining the different scores for the different factors. In some implementations, the support platform may generate scores for the current calls with the other users in a similar manner.

Figure 1G:
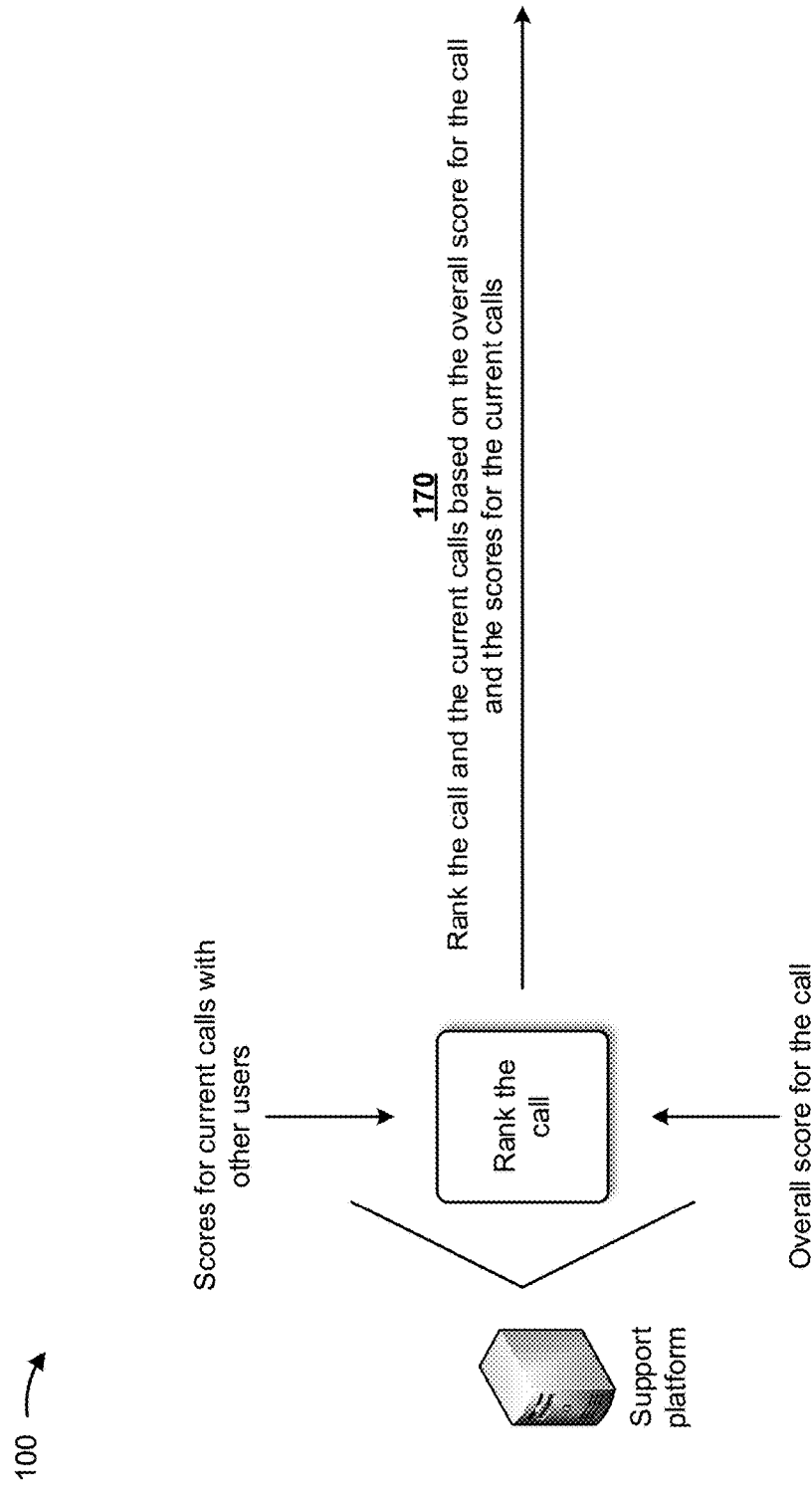

As shown in FIG. 1G, and by reference number 170, the support platform may rank the call and the current calls based on the overall score for the call and the scores for the current calls with the other users. In some implementations, a call associated with a greatest score may be ranked first (e.g., position 1), a call associated with a next greatest score may be ranked second (e.g., position 2), a call associated with still a next greatest score may be ranked third (e.g., position 3), and/or the like.

Figure 1H:
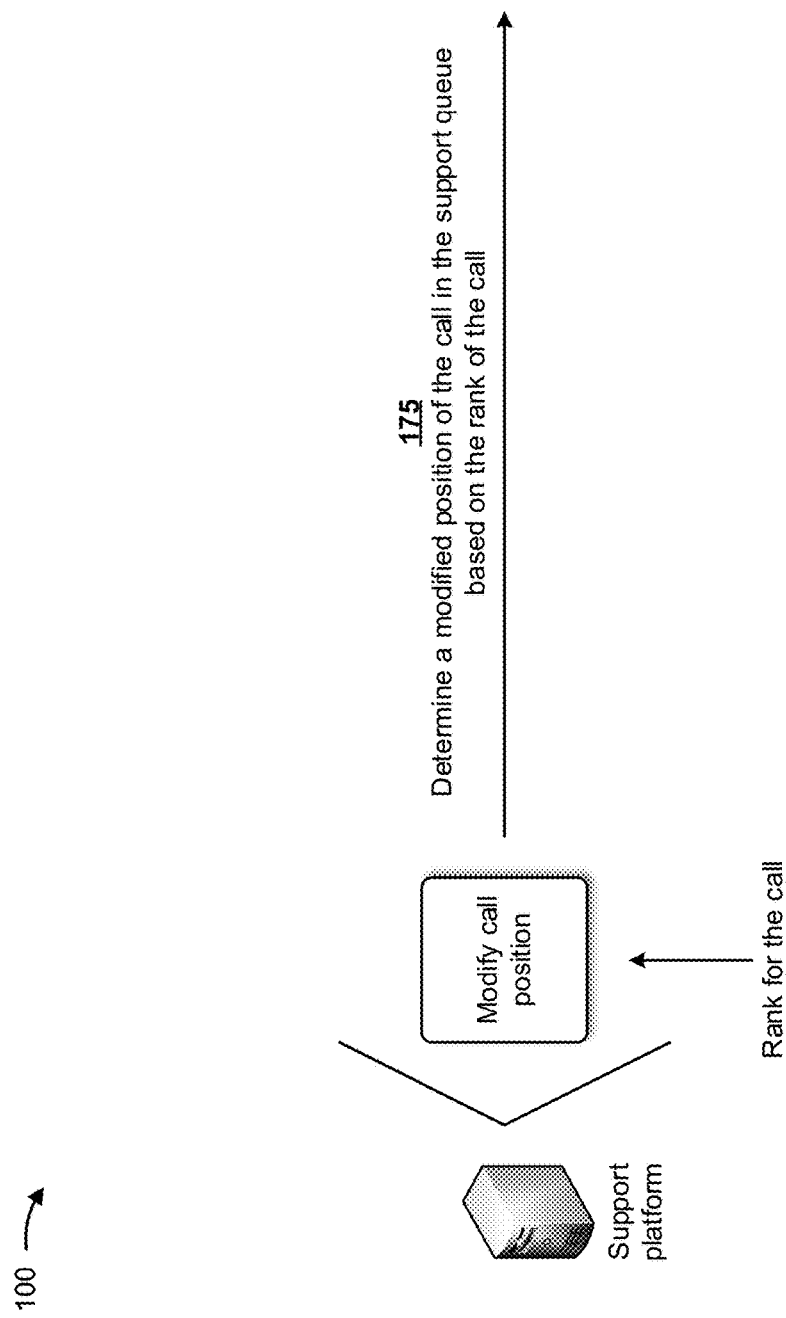

As shown in FIG. 1H, and by reference number 175, the support platform may determine a modified position of the call in the support queue based on the rank of the call. In some implementations, the support platform may not rank the call and may determine the modified position of the call in the support queue based on the overall score of the call as compared to the scores for the current calls with the other users. In some implementations, the support platform may determine modified positions of the current calls based on ranks of the current calls. In some implementations, the support platform may not rank the current calls and may determine the modified positions of the current calls in the support queue based on the scores for the current calls.

In some implementations, the support platform may re-rank the call and the current calls in the support queue based on the scores generated for the call and the current calls. In such implementations, a call associated with a greatest score may be ranked first (e.g., position 1), a call associated with a next greatest score may be ranked second (e.g., position 2), and/or the like.

Figure 1I:
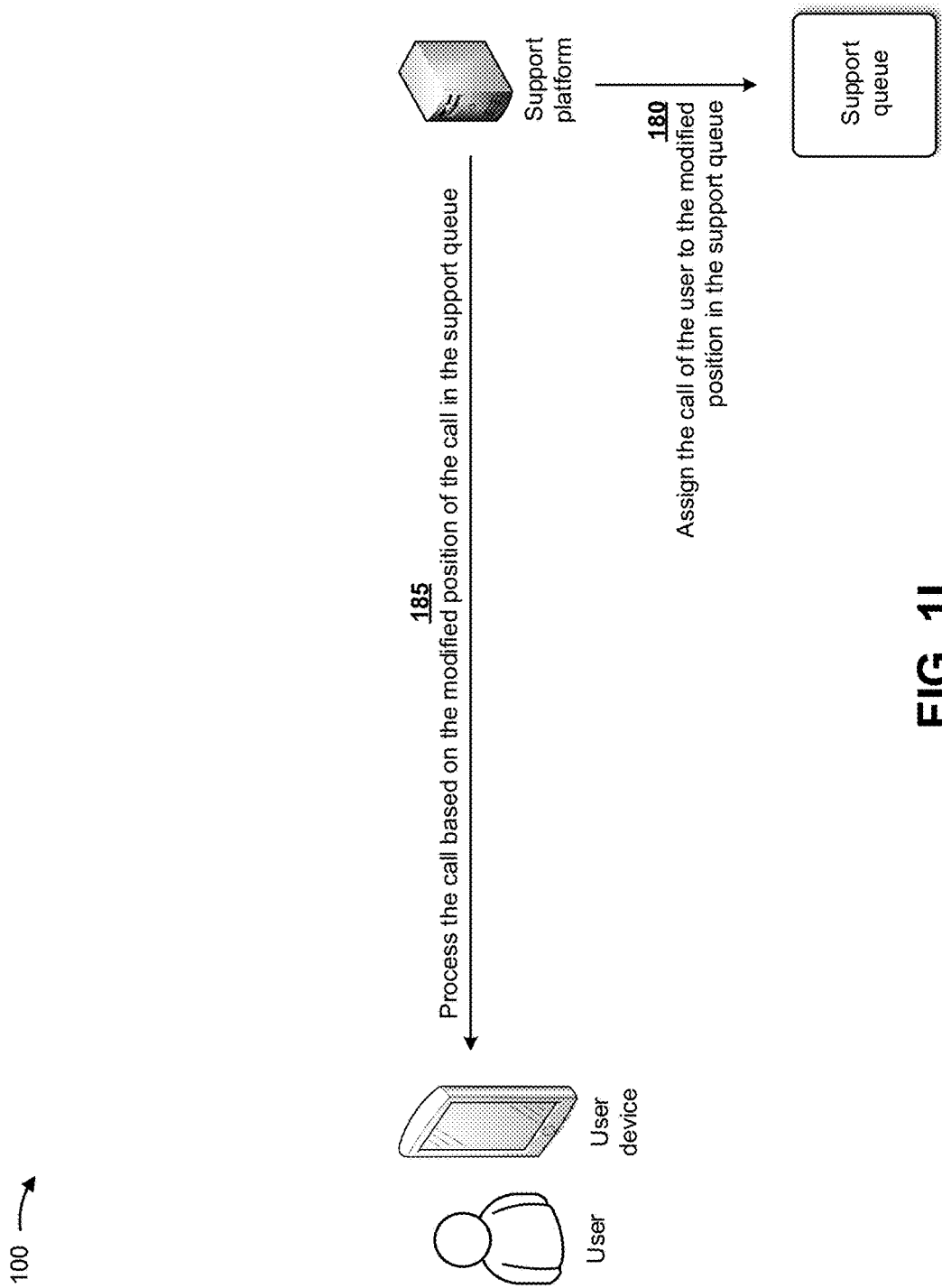

As shown in FIG. 1I, and by reference number 180, the support platform may assign the call of the user to the modified position in a support queue. As further shown in FIG. 1I, and by reference number 185, the support platform may process the call based on the modified position of the call in the support queue. In some implementations, the support platform may determine one or more actions to perform based on the support issue of the user and may perform the one or more actions to process the call; may connect support personnel with the user (e.g., for provision of the actions to perform) to process the call; and/or the like.

As shown in FIG. 1J, and by reference number 190, the support platform may perform one or more actions based on modifying a position of a call in the support queue. For example, the one or more actions may include the support platform informing a user (e.g., via a user device) that the user's position in the support queue improved. In this way, the user may be encouraged to continue seeking help for support issues in the future.

In some implementations, the one or more actions may include the support platform processing the call of the user based on modifying the position of the call. For example, the position of the call may be moved to the top of the support queue and may be immediately processed. In this way, the call may be handled sooner than if the position of the call was not modified.

In some implementations, the one or more actions may include the support platform requesting verification of an identify of the user. In this way, the support platform may ensure that the user is not a malicious user seeking to steal account credentials, which may conserve resources that would otherwise be wasted in handling theft of account credentials.

In some implementations, the one or more actions may include the support platform disconnecting the call with the user (e.g., a user device) when the support issue is resolved. In this way, the support platform may conserve resources (e.g., processing resources, memory resources, and/or the like) associated with unnecessarily processing a call.

In some implementations, the one or more actions may include the support platform providing (e.g., to the user device associated with the user) information indicating the modified position of the call in the support queue. In this way, the modified position of the call may encourage the user to remain on the call and wait for help.

In some implementations, the one or more actions may include the support platform causing a device (e.g., a non-operational device in a network) to reboot or execute a self-diagnostic action. In this way, the support platform may resolve a support issue associated with the device.

In some implementations, the one or more actions may include the support platform causing a device to attempt to communicate with another device (e.g., a malfunctioning device) and/or causing the device to attempt to diagnose or repair the other device. In this way, the support platform may attempt to resolve a support issue associated with the other device.

In some implementations, the one or more actions may include the support platform causing an autonomous vehicle to travel to a location of a user (e.g., to provide a technician with tools, diagnostic equipment, repair equipment, replacement equipment, and/or the like). In this way, the support platform may take preemptive actions to resolve a support issue.

In some implementations, the one or more actions may include the support platform causing an unmanned aerial vehicle (UAV) to travel to a location of the user (e.g., to provide a technician with tools, diagnostic equipment, repair equipment, replacement equipment, and/or the like). In this way, the support platform may take preemptive actions to resolve a support issue.

In this way, several different stages of the process for determining support queue positions for support calls are automated with machine learning, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that utilizes machine learning with call histories to determine support queue positions for support calls. Finally, automating the process for determining support queue positions for support calls conserves computing resources (e.g., processing resources, memory resources, and/or the like) that would otherwise be wasted in attempting to process support calls.

As indicated above, FIGS. 1A-1J are provided merely as examples. Other examples may differ from what is described with regard to FIGS. 1A-1J.

Figure 2:
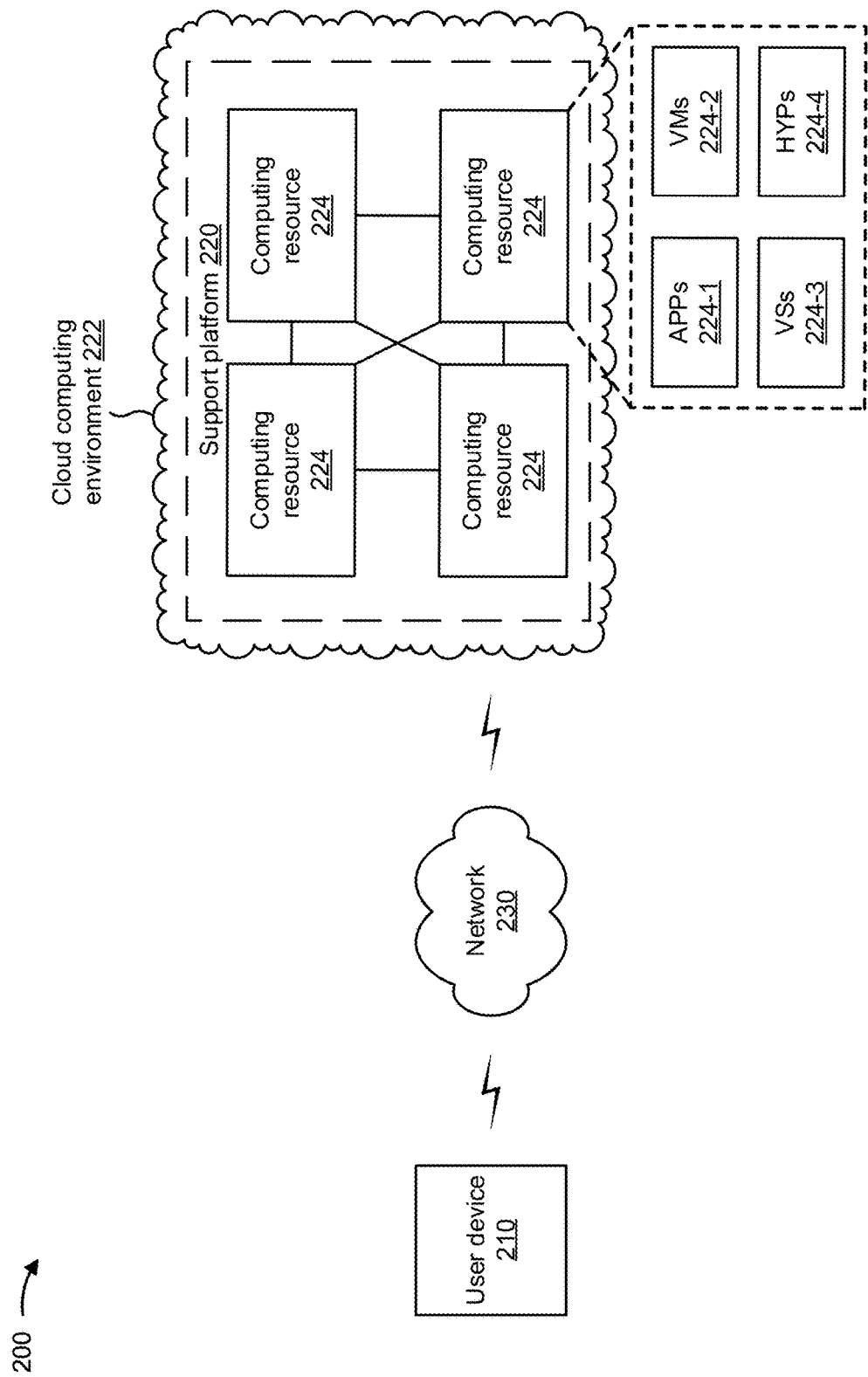
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a support platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to support platform 220.

Support platform 220 includes one or more devices that utilize machine learning with call histories to determine support queue positions for support calls. In some implementations, support platform 220 may be designed to be modular such that certain software components may be swapped in or out depending on a particular need. As such, support platform 220 may be easily and/or quickly reconfigured for different uses. In some implementations, support platform 220 may receive information from and/or transmit information to one or more user devices 210.

In some implementations, as shown, support platform 220 may be hosted in a cloud computing environment 222. Notably, while implementations described herein describe support platform 220 as being hosted in cloud computing environment 222, in some implementations, support platform 220 may not be cloud-based (i.e., may be implemented outside of a cloud computing environment) or may be partially cloud-based.

Cloud computing environment 222 includes an environment that hosts support platform 220. Cloud computing environment 222 may provide computation, software, data access, storage, etc., services that do not require end-user knowledge of a physical location and configuration of system(s) and/or device(s) that host support platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host support platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with support platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of user device 210 or an operator of support platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
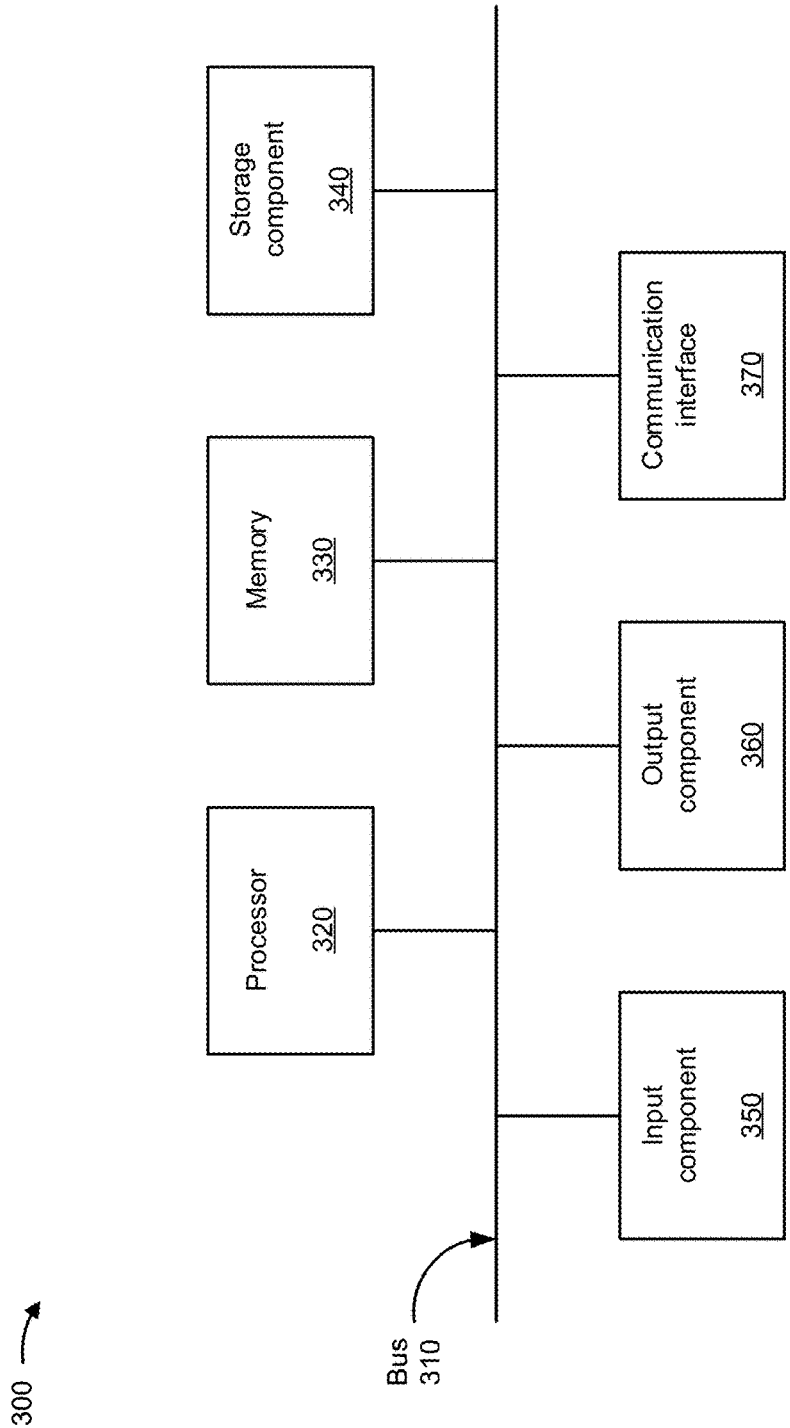
FIG. 3 is a diagram of example components of one or more devices of FIG. 2.

FIG. 3 is a diagram of example components of a device 300. Device 300 may correspond to user device 210, support platform 220, and/or computing resource 224. In some implementations, user device 210, support platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
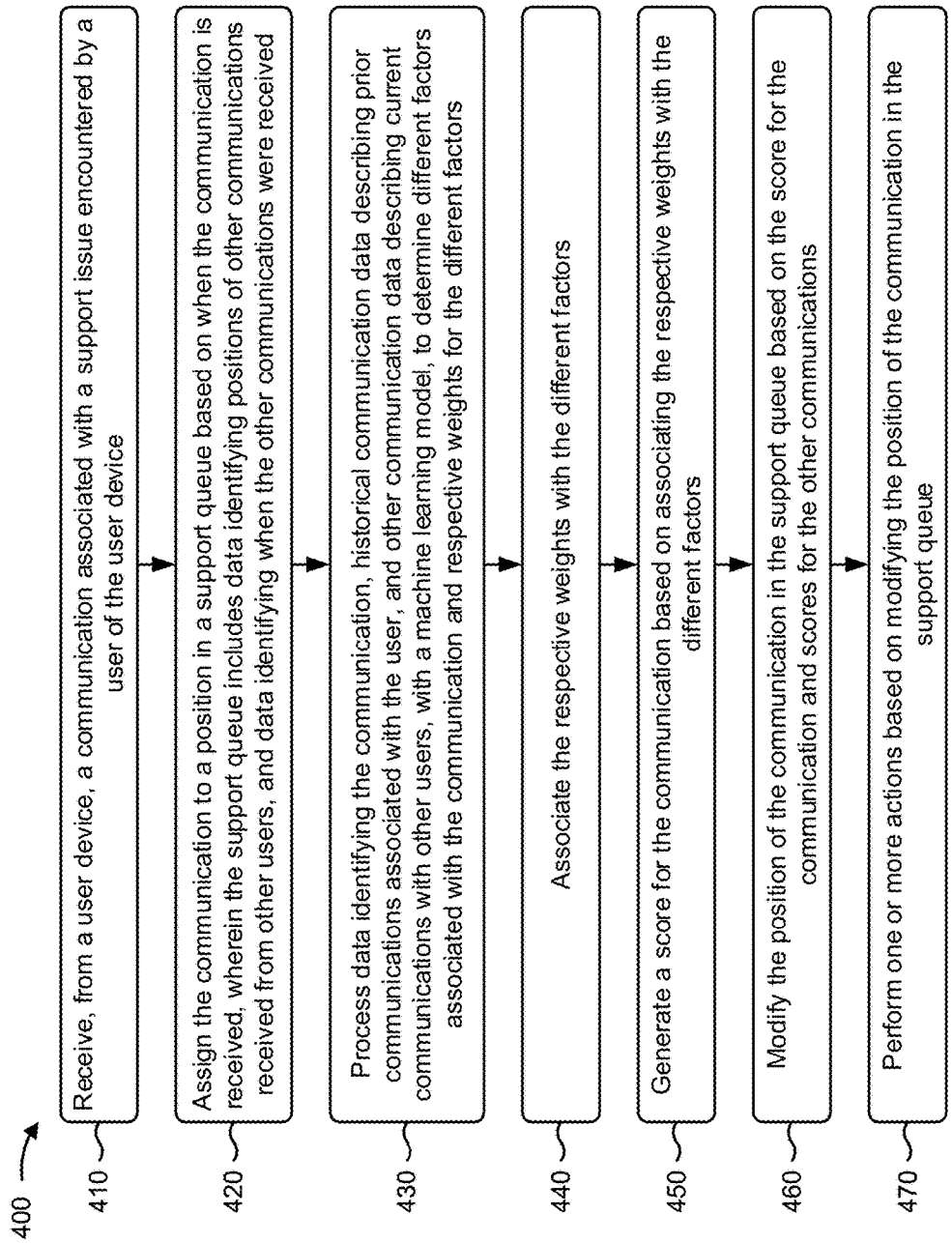

FIG. 4 is a flow chart of an example process 400 for utilizing machine learning with call histories to determine support queue positions for support calls. In some implementations, one or more process blocks of FIG. 4 may be performed by a support platform (e.g., support platform 220). In some implementations, one or more process blocks of FIG. 4 may be performed by another device or a group of devices separate from or including the support platform, such as a user device (e.g., user device 210).

As shown in FIG. 4, process 400 may include receiving, from a user device, a communication associated with a support issue encountered by a user of the user device (block 410). For example, the support platform (e.g., using computing resource 224, processor 320, communication interface 370, and/or the like) may receive, from a user device, a communication associated with a support issue encountered by a user of the user device, as described above in connection with FIGS. 1A-2.

As further shown in FIG. 4, process 400 may include assigning the communication to a position in a support queue based on when the communication is received, wherein the support queue includes data identifying positions of other communications received from other users, and data identifying when the other communications were received (block 420). For example, the support platform (e.g., using computing resource 224, processor 320, memory 330, and/or the like) may assign the communication to a position in a support queue based on when the communication is received, as described above in connection with FIGS. 1A-2. In some implementations, the support queue may include data identifying positions of other communications received from other users, and data identifying when the other communications were received.

As further shown in FIG. 4, process 400 may include processing data identifying the communication, historical communication data describing prior communications associated with the user, and other communication data describing current communications with other users, with a machine learning model, to determine different factors associated with the communication and respective weights for the different factors (block 430). For example, the support platform (e.g., using computing resource 224, processor 320, storage component 340, and/or the like) may process data identifying the communication, historical communication data describing prior communications associated with the user, and other communication data describing current communications with other users, with a machine learning model, to determine different factors associated with the communication and respective weights for the different factors, as described above in connection with FIGS. 1A-2.

As further shown in FIG. 4, process 400 may include associating the respective weights with the different factors (block 440). For example, the support platform (e.g., using computing resource 224, processor 320, memory 330, and/or the like) may associate the respective weights with the different factors, as described above in connection with FIGS. 1A-2.

As further shown in FIG. 4, process 400 may include generating a score for the communication based on associating the respective weights with the different factors (block 450). For example, the support platform (e.g., using computing resource 224, processor 320, storage component 340, and/or the like) may generate a score for the communication based on associating the respective weights with the different factors, as described above in connection with FIGS. 1A-2.

As further shown in FIG. 4, process 400 may include modifying the position of the communication in the support queue based on the score for the communication and scores for the other communications (block 460). For example, the support platform (e.g., using computing resource 224, processor 320, memory 330, and/or the like) may modify the position of the communication in the support queue based on the score for the communication and scores for the other communications, as described above in connection with FIGS. 1A-2.

As further shown in FIG. 4, process 400 may include performing one or more actions based on modifying the position of the communication in the support queue (block 470). For example, the support platform (e.g., using computing resource 224, processor 320, memory 330, communication interface 370, and/or the like) may perform one or more actions based on modifying the position of the communication in the support queue, as described above in connection with FIGS. 1A-2.

Process 400 may include additional implementations, such as any single implementation or any combination of implementations described below and/or described with regard to any other process described herein.

In some implementations, when performing the one or more actions, the support platform may provide data indicating that the position of the communication in the support queue improved; may process the communication of the user based on modifying the position of the communication; may request, from the user device, verification of an identity of the user; and/or may disconnect the communication with the user device when the support issue is resolved.

In some implementations, when performing the one or more actions, the support platform may provide, to the user device, data identifying movement in the support queue for the position of the communication of the user; may cause a device to reboot or execute a self-diagnostic action; and/or may cause the device to attempt to communicate with or attempt to repair another device.

In some implementations, when performing the one or more actions, the support platform may process the communication based on modifying the position of the communication in the support queue. In some implementations, the historical communication data may indicate that the prior communications required the user to wait on hold for a time period, and, when modifying the position of the communication in the support queue, the support platform may modify the position of the communication in the support queue based on the time period.

In some implementations, the historical communication data may indicate that at least one of the prior communications is associated with the support issue, and, when modifying the position of the communication in the support queue, the support platform may assign the communication to a top position in the support queue. In some implementations, the data identifying the communication and the historical communication data may include an identifier that identifies the user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for utilizing machine learning with call histories to determine support queue positions for support calls. In some implementations, one or more process blocks of FIG. 5 may be performed by a support platform (e.g., support platform 220). In some implementations, one or more process blocks of FIG. 5 may be performed by another device or a group of devices separate from or including the support platform, such as a user device (e.g., user device 210).

As shown in FIG. 5, process 500 may include receiving, from a user device, a communication associated with a support issue encountered by a user of the user device (block 510). For example, the support platform (e.g., using computing resource 224, processor 320, communication interface 370, and/or the like) may receive, from a user device, a communication associated with a support issue encountered by a user of the user device, as described above in connection with FIGS. 1A-2.

As further shown in FIG. 5, process 500 may include assigning the communication to a position in a support queue based on when the communication is received, wherein the support queue includes data identifying positions of other communications received from other users, and data identifying when the other communications were received (block 520). For example, the support platform (e.g., using computing resource 224, processor 320, storage component 340, and/or the like) may assign the communication to a position in a support queue based on when the communication is received, as described above in connection with FIGS. 1A-2. In some implementations, the support queue may include data identifying positions of other communications received from other users, and data identifying when the other communications were received.

As further shown in FIG. 5, process 500 may include processing data identifying the communication, historical communication data describing prior communications associated with the user, and other communication data describing current communications with other users, with a machine learning model, to determine different factors associated with the communication and respective weights for the different factors (block 530). For example, the support platform (e.g., using computing resource 224, processor 320, memory 330, and/or the like) may process data identifying the communication, historical communication data describing prior communications associated with the user, and other communication data describing current communications with other users, with a machine learning model, to determine different factors associated with the communication and respective weights for the different factors, as described above in connection with FIGS. 1A-2.

As further shown in FIG. 5, process 500 may include associating the respective weights with the different factors (block 540). For example, the support platform (e.g., using computing resource 224, processor 320, storage component 340, and/or the like) may associate the respective weights with the different factors, as described above in connection with FIGS. 1A-2.

As further shown in FIG. 5, process 500 may include generating a score for the communication based on associating the respective weights with the different factors (block 550). For example, the support platform (e.g., using computing resource 224, processor 320, memory 330, and/or the like) may generate a score for the communication based on associating the respective weights with the different factors, as described above in connection with FIGS. 1A-2.

As further shown in FIG. 5, process 500 may include assigning the communication to a different position in the support queue based on the score for the communication (block 560). For example, the support platform (e.g., using computing resource 224, processor 320, storage component 340, and/or the like) may assign the communication to a different position in the support queue based on the score for the communication, as described above in connection with FIGS. 1A-2.

As further shown in FIG. 5, process 500 may include performing one or more actions based on assigning the communication to the different position in the support queue (block 570). For example, the support platform (e.g., using computing resource 224, processor 320, memory 330, communication interface 370, and/or the like) may perform one or more actions based on assigning the communication to the different position in the support queue, as described above in connection with FIGS. 1A-2.

Process 500 may include additional implementations, such as any single implementation or any combination of implementations described below and/or described with regard to any other process described herein.

In some implementations, when performing the one or more actions, the support platform may provide data indicating that the different position of the communication in the support queue is improved relative to the position in the support queue, may process the communication of the user based on assigning the communication to the different position in the support queue, may disconnect the communication with the user device when the support issue is resolved, may cause an autonomous vehicle to travel to a location of the user, and/or may cause an unmanned aerial vehicle to travel to the location of the user.

In some implementations, when performing the one or more actions, the support platform may cause a particular device to reboot, may cause the particular device to execute a self-diagnostic action, may attempt to communicate with the particular device, and/or may attempt to repair the particular device. In some implementations, the support platform may provide, to the user device, data identifying movement in the support queue for the communication, and may provide, to the user device, data indicating points awarded to the user based on the movement in the support queue for the communication.

In some implementations, the support platform may receive, from the user device, another communication associated with another support issue encountered by the user of the user device; may determine an average time spent on hold by the user for the prior communications based the historical communication data describing the prior communications; and may assign the other communication to a position in the support queue based on the average time.

In some implementations, the historical communication data may indicate that at least one of the prior communications is associated with the support issue, and, when assigning the communication to the different position in the support queue, the support platform may assign the communication to a top position in the support queue.

In some implementations, the other communication data may indicate that at least one of the current communications with the other users is associated with a problem user, and the support platform, when modifying the position of the communication in the support queue, may assign the communication to a better position in the support queue than a position of the at least one of the current communications associated with the problem user.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for utilizing machine learning with call histories to determine support queue positions for support calls. In some implementations, one or more process blocks of FIG. 6 may be performed by a support platform (e.g., support platform 220). In some implementations, one or more process blocks of FIG. 6 may be performed by another device or a group of devices separate from or including the support platform, such as a user device (e.g., user device 210).

As shown in FIG. 6, process 600 may include receiving, from a user device, a communication associated with a support issue encountered by a user of the user device (block 610). For example, the support platform (e.g., using computing resource 224, processor 320, communication interface 370, and/or the like) may receive, from a user device, a communication associated with a support issue encountered by a user of the user device, as described above in connection with FIGS. 1A-2.

As further shown in FIG. 6, process 600 may include assigning the communication to a position in a support queue based on when the communication is received, wherein the support queue includes data identifying positions of other communications received from other users, and data identifying when the other communications were received (block 620). For example, the support platform (e.g., using computing resource 224, processor 320, storage component 340, and/or the like) may assign the communication to a position in a support queue based on when the communication is received, as described above in connection with FIGS. 1A-2. In some implementations, the support queue may include data identifying positions of other communications received from other users, and data identifying when the other communications were received.

As further shown in FIG. 6, process 600 may include processing data identifying the communication and historical communication data describing prior communications associated with the user, with a model, to determine an average time spent on hold by the user for the prior communications (block 630). For example, the support platform (e.g., using computing resource 224, processor 320, memory 330, and/or the like) may process data identifying the communication and historical communication data describing prior communications associated with the user, with a model, to determine an average time spent on hold by the user for the prior communications, as described above in connection with FIGS. 1A-2.

As further shown in FIG. 6, process 600 may include modifying the position of the communication in the support queue based on the average time (block 640). For example, the support platform (e.g., using computing resource 224, processor 320, storage component 340, and/or the like) may modify the position of the communication in the support queue based on the average time, as described above in connection with FIGS. 1A-2.

As further shown in FIG. 6, process 600 may include performing one or more actions based on modifying the position of the communication in the support queue (block 650). For example, the support platform (e.g., using computing resource 224, processor 320, memory 330, communication interface 370, and/or the like) may perform one or more actions based on modifying the position of the communication in the support queue, as described above in connection with FIGS. 1A-2.

Process 600 may include additional implementations, such as any single implementation or any combination of implementations described below and/or described with regard to any other process described herein.

In some implementations, the support platform may receive, from the user device, another communication associated with another support issue encountered by the user of the user device; may assign the other communication to a position in a support queue based on when the other communication is received; may process data identifying the other communication, the historical communication data, and other communication data describing current communications with other users, with a machine learning model, to determine different factors associated with the other communication and respective weights for the different factors; may associate the respective weights with the different factors, may generate a score for the other communication based on associating the respective weights with the different factors; and may modify the position of the other communication in the support queue based on the score for the other communication.

In some implementations, when performing the one or more actions, the support platform may provide data indicating that the position of the communication in the support queue improved, may process the communication of the user based on modifying the position of the communication, and/or may disconnect the communication with the user device when the support issue is resolved.

In some implementations, when performing the one or more actions, the support platform may cause a particular device to reboot, may cause the particular device to execute a self-diagnostic action, may attempt to communicate with the particular device, and/or may attempt to repair the particular device.

In some implementations, when performing the one or more actions, the support platform may process the communication based on modifying the position of the communication in the support queue. In some implementations, the data identifying the communication and the historical communication data may include an identifier that identifies the user.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device and from a user device, a communication associated with a support issue encountered by a user of the user device;
    assigning, by the device, the communication to a position in a support queue based on when the communication is received,
        wherein the support queue includes:
            data identifying positions of other communications received from other users, and
            data identifying when the other communications, received from the other users, were received;
    processing, by the device, data identifying the communication, historical communication data describing prior communications associated with the user, and other communication data describing the other communications received from the other users, with a machine learning model, to determine different factors associated with the communication and respective weights for the different factors;
    associating, by the device, the respective weights with the different factors;
    generating, by the device, a score for the communication based on associating the respective weights with the different factors;
    modifying, by the device, the position of the communication in the support queue based on the score for the communication and other scores for the other communications received from the other users; and
    performing, by the device, one or more actions based on modifying the position of the communication in the support queue.

2. The method of claim 1, wherein performing the one or more actions includes one or more of:
    providing data indicating that the position of the communication in the support queue improved;
    processing the communication of the user based on modifying the position of the communication;
    requesting, from the user device, verification of an identity of the user; or
    disconnecting the communication with the user device when the support issue is resolved.

3. The method of claim 1, wherein performing the one or more actions includes one or more of:
    providing, to the user device, data identifying movement in the support queue for the position of the communication of the user;
    causing another device to reboot or execute a self-diagnostic action; or
    causing the device to attempt to communicate with or attempt to repair the other device.

4. The method of claim 1, wherein performing the one or more actions comprises:
    processing the communication based on modifying the position of the communication in the support queue.

5. The method of claim 1, wherein the historical communication data indicates that the prior communications required the user to wait on hold for a time period, and modifying the position of the communication in the support queue comprises:
    modifying the position of the communication in the support queue based on the time period.

6. The method of claim 1, wherein the historical communication data indicates that at least one of the prior communications is associated with the support issue, and modifying the position of the communication in the support queue comprises:
    assigning the communication to a top position in the support queue.

7. The method of claim 1, wherein the data identifying the communication and the historical communication data include:
    an identifier that identifies the user.

8. A device, comprising:
    one or more memories; and
    one or more processors, communicatively coupled to the one or more memories, to:

receive, from a user device, a communication associated with a support issue encountered by a user of the user device;
assign the communication to a position in a support queue based on when the communication is received, wherein the support queue includes:
  data identifying positions of other communications received from other users, and
  data identifying when the other communications, received from the other users, were received;
process data identifying the communication, historical communication data describing prior communications associated with the user, and other communication data describing the other communications received from the other users, with a machine learning model, to determine different factors associated with the communication and respective weights for the different factors;
associate the respective weights with the different factors;
generate a score for the communication based on associating the respective weights with the different factors;
assign the communication to a different position in the support queue based on the score for the communication; and
perform one or more actions based on assigning the communication to the different position in the support queue.

9. The device of claim 8, wherein the one or more processors, when performing the one or more actions, are to one or more of:
provide data indicating that the different position of the communication in the support queue is improved relative to the position in the support queue;
process the communication of the user based on assigning the communication to the different position in the support queue;
disconnect the communication with the user device when the support issue is resolved;
cause an autonomous vehicle to travel to a location of the user; or
cause an unmanned aerial vehicle to travel to the location of the user.

10. The device of claim 8, wherein the one or more processors, when performing the one or more actions, are to one or more of:
cause a particular device to reboot;
cause the particular device to execute a self-diagnostic action;
attempt to communicate with the particular device; or
attempt to repair the particular device.

11. The device of claim 8, wherein the one or more processors are further to:
provide, to the user device, data identifying movement in the support queue for the communication; and
provide, to the user device, data indicating points awarded to the user based on the movement in the support queue for the communication.

12. The device of claim 8, wherein the one or more processors are further to:
receive, from the user device, a second communication associated with a second support issue encountered by the user of the user device;
determine an average time spent on hold by the user for the prior communications based the historical communication data describing the prior communications; and
assign the second communication to a second position in the support queue based on the average time.

13. The device of claim 8, wherein the historical communication data indicates that at least one of the prior communications is associated with the support issue, and the one or more processors, when assigning the communication to the different position in the support queue, are to:
assign the communication to a top position in the support queue.

14. The device of claim 8, wherein the other communication data indicates that a particular communication, of at least one of the other communications received from the other users, is associated with a problem user, and the one or more processors, when modifying the position of the communication in the support queue, are to:
assign the communication to better position in the support queue than a second position to which the particular communication is assigned.

15. A non-transitory computer-readable medium storing instructions, the instructions comprising:
one or more instructions that, when executed by one or more processors of a device, cause the one or more processors to:
receive, from a user device, a communication associated with a support issue encountered by a user of the user device;
assign the communication to a position in a support queue based on when the communication is received, wherein the support queue includes:
  data identifying positions of other communications received from other users, and
  data identifying when the other communications, received from the other users, were received;
process data identifying the communication, historical communication data describing prior communications associated with the user, and other communication data describing the other communications received from the other users, with a machine learning model, to determine different factors associated with the communication and respective weights for the different factors;
associate the respective weights with the different factors;
generate a score for the communication based on associating the respective weights with the different factors;
modify the position of the communication in the support queue based on the score for the communication; and
perform one or more actions based on modifying the position of the communication in the support queue.

16. The non-transitory computer-readable medium of claim 15, wherein the instructions further comprise:
one or more instructions that, when executed by the one or more processors, cause the one or more processors to:
receive, from the user device, a second communication associated with a second support issue encountered by the user of the user device;
assign the second communication to a second position in the support queue based on when the second communication is received;
process data identifying the second communication, the historical communication data, and the other communication data describing the other communications received from the other users, with the machine learning model, to determine second factors associated with the second communication and respective second weights for the second factors;

associate the respective second weights with the second factors;

generate a second score for the second communication based on associating the respective second weights with the second factors; and modify the second position of the second communication in the support queue based on the second score for the second communication.

17. The non-transitory computer-readable medium of claim 15, wherein the one or more instructions, that cause the one or more processors to perform the one or more actions, cause the one or more processors to one or more of:

provide data indicating that the position of the communication in the support queue improved;

process the communication based on modifying the position of the communication; or disconnect the communication when the support issue is resolved.

18. The non-transitory computer-readable medium of claim 15, wherein the one or more instructions, that cause the one or more processors to perform the one or more actions, cause the one or more processors to one or more of:

cause a particular device to reboot;

cause the particular device to execute a self-diagnostic action;

attempt to communicate with the particular device; or attempt to repair the particular device.

19. The non-transitory computer-readable medium of claim 15, wherein the one or more instructions, that cause the one or more processors to perform the one or more actions, cause the one or more processors to at least:

process the communication based on modifying the position of the communication in the support queue.

20. The non-transitory computer-readable medium of claim 15, wherein the data identifying the communication and the historical communication data include:

an identifier that identifies the user.

* * * * *